United States Patent [19]

Pedersen et al.

[11] Patent Number: 5,241,794
[45] Date of Patent: Sep. 7, 1993

[54] GRINDING WHEEL FOR CUTTING BLADES

[75] Inventors: Harry Pedersen, Penfield; Harry D. Dodd, Rochester, both of N.Y.

[73] Assignee: The Gleason Works, Rochester, N.Y.

[21] Appl. No.: 920,967

[22] Filed: Jul. 28, 1992

Related U.S. Application Data

[62] Division of Ser. No. 530,776, May 30, 1990, Pat. No. 5,168,661.

[51] Int. Cl.$^5$ ............................................. B24D 7/14
[52] U.S. Cl. ...................................... 51/209 R; 51/288
[58] Field of Search ................... 51/206 R, 209 R, 207, 51/285, 288, 181 R

[56] References Cited

U.S. PATENT DOCUMENTS

| | | | |
|---|---|---|---|
| 1,285,124 | 11/1918 | Gleason | 51/3 |
| 1,710,533 | 4/1929 | De Vlieg | 51/288 |
| 2,346,865 | 10/1940 | Pelphrey | 51/287 |
| 2,410,348 | 10/1946 | Johanson et al. | 51/95 WH |
| 2,496,352 | 2/1950 | Metzger et al. | 51/181 |
| 2,600,815 | 6/1952 | Turner | 51/209 R |
| 2,629,973 | 3/1953 | Candee | 51/105 R |
| 2,819,564 | 1/1958 | Johnson | 51/288 |
| 3,538,649 | 11/1970 | Williams | 51/100 |
| 3,881,889 | 5/1975 | Hunkeler | 51/288 |
| 3,885,925 | 5/1975 | Tatar | 51/288 |
| 4,163,345 | 8/1979 | Meili | 51/33 W |
| 4,170,091 | 10/1979 | Ellwanger et al. | 51/5 D |
| 4,186,529 | 2/1980 | Huffman | 51/288 |
| 4,265,053 | 5/1981 | Kotthaus | 51/3 |
| 4,338,748 | 7/1982 | Elbel | 51/206 R |

FOREIGN PATENT DOCUMENTS

| | | |
|---|---|---|
| 530625 | 12/1940 | United Kingdom . |
| 530670 | 12/1940 | United Kingdom . |
| 696804 | 9/1953 | United Kingdom . |
| 875566 | 8/1961 | United Kingdom . |
| 2053043 | 2/1981 | United Kingdom . |

Primary Examiner—Robert A. Rose
Attorney, Agent, or Firm—Robert L. McDowell; Ralph E. Harper

[57] ABSTRACT

A grinding process and wheel are disclosed wherein any or all surfaces of a cutting blade may be generated in a continuous grinding operation utilizing a single grinding wheel having a simple profile. A grinding wheel having a grinding profile comprising an inner conical surface and an adjacent outer narrow substantially flat surface is provided. The inner conical surface rough grinds to generate a roughed blade surface and the adjacent outer narrow substantially flat surface finish grinds the roughed surface to generate a finished blade surface. Computer numerical control (CNC) is utilized to control the relative movement of the grinding wheel and cutting blade along or about a plurality of axes. Inner and outer arcuate grinding surfaces may also be provided for rough grinding.

11 Claims, 10 Drawing Sheets

Figure 11

GRINDING WHEEL FOR CUTTING BLADES

This is a divisional of copending application Ser. No. 07/530,776 filed May 30, 1990, now U.S. Pat. No. 5,168,661.

TECHNICAL FIELD

The present invention is directed to the field of grinding and more particularly to grinding the surfaces of cutting blades utilizing a grinding wheel having a simple grinding profile to generate any number of desired cutting blade surfaces.

BACKGROUND OF THE INVENTION

Cutting blades find a great number of applications in industry, (for example, cutting blades utilized in the production of gears).

The shape of cutting blades vary greatly. Different blade geometries are usually required to produce gears of different geometries. A cutting blade may have several different surfaces which effect the particular shape, size and location of the blade profile which, in turn, may influence the shape of the cut gear. Examples of these surfaces are cutting side, clearance side, shoulder, and edge radius.

The most common method to produce a specified shape on the surface of a blade is form grinding. In this method the inverse shape of the blade surface is dressed (formed) into a grinding wheel and then the grinding wheel is plunge fed into the blade. The shape of the blade is controlled by a dresser, usually a diamond tipped tool, that is capable of dressing (forming) the required range of shapes into a grinding wheel face. An example of a dressed grinding wheel is illustrated by British Patent Specification 696,804 which shows a wheel having a flat active grinding surface. This surface would produce a planar surface on a cutting blade, the orientation of the planar surface being dependent upon the angle in which the blade is traversed across the grinding wheel surface.

In order to form more than one surface shape on a blade a plurality of dressed grinding wheels have been used as shown by U.S. Pat. Nos. 1,285,124, 2,410,348, 2,629,973 and 4,265,053. Each grinding wheel forms one surface on a blade.

Another approach has been to use a grinding wheel with more than one profile dressed into it as disclosed by U.S. Pat. No. 3,881,889. The grinding wheel in this disclosure comprises two separate grinding surfaces.

A somewhat different approach has been to utilize a template or cam as a guide to dictate the path of a grinding wheel across the surface of a cutting blade as seen in U.S. Pat. Nos. 3,538,649 and 4,163,345 respectively.

The use of a single profiled wheel to form desired surfaces on opposite sides of a blade is shown by U.S. Pat. No. 2,346,865. However, the cutting profiles are of the same shape, thus requiring only one shape to be dressed into the grinding wheel, and the blade must be reversed in its holding block in order to form both profiles.

A more recent approach has been the generating of surfaces on a blade. U.S. Pat. No. 4,170,091 shows a plurality of cutting blades secured in a tool-holding ring. The ring is rotated and the top portion of the blades is brought into contact with a rotating grinding wheel to form a topland surface. The tool-holding ring is then pivoted while the blades are in contact with the grinding wheel. This results in a rounded corner being generated between the topland and a side surface. The continued pivoting of the ring results in contact of the side surface of the blades with the grinding wheel thereby forming the desired shape on the side surface. The ring is turned completely over and the process is then repeated for the opposite side of the blades. However, the grinding wheel in this process must still be dressed with a particular profile capable of forming the desired shape on the side surfaces of the blades.

The grinding machine of U.S. Pat. No. 4,186,529 comprises up to ten computer numerically controlled (CNC) axes. These axes permit the grinding wheel and the cutting blade to be moved relative to one another and be brought into engagement with one another at almost any desired angular relation necessary for the grinding of the blade surfaces. A preferred grinding wheel is shaped in the form of a saucer having a conical shaped grinding surface. The disclosure further states that the shape of the grinding wheel will depend upon the shape of the product to be ground.

SUMMARY OF THE INVENTION

The present invention is drawn to a method of grinding the surfaces of cutting blades utilizing a simple profiled grinding wheel to generate any desired surface on a cutting blade.

The method also may be applied to the generation of a plurality of cutting blade surfaces, even of different configurations, on a cutting blade utilizing the same profiled grinding wheel.

The grinding wheel of the present invention has a grinding profile located on a side face thereof. The grinding profile comprises an inner conical surface and an outer adjacent narrow substantially flat surface. The grinding profile may further include an inner arcuate grinding surface and an outer arcuate grinding surface. Rough grinding of a cutting blade surface is performed by the inner conical surface, the inner arcuate surface and/or the outer arcuate surface to generate a roughed surface of a desired shape and finish grinding of the roughed cutting blade surface is performed by the outer adjacent narrow substantially flat surface to generate a finished surface on the cutting blade.

The generation of the desired cutting blade surface is accomplished by the traversal of the edge surface of the cutting blade across the desired surface or surfaces of grinding wheel profile. During finish grinding the outer narrow substantially flat surface of the grinding profile is kept tangent to the finished surface being generated on the cutting blade.

To generate any desired surface, the grinding wheel, and hence the grinding profile, and the cutting blade, which is releasably mounted in a work holder, are capable of mutually orthogonal linear movement in three dimensions relative to one another. Also, the grinding wheel is rotatable about its axis, the mounted cutting blade is rotatable about a longitudinal axis of a work spindle and either the grinding wheel or the mounted cutting blade are angularly (pivotally) movable.

These linear, rotational and angular movements of a mounted cutting blade and/or the grinding wheel enable any desired surface to be generated on the cutting blade. Since any desired surface profile can be defined mathematically, the equations defining a particular surface can be converted to numerical language and input to a computer which, through numerical control (CNC), can control the simultaneous and independent movements and the relative positions of the grinding wheel and mounted cutting blade along or about any or all axes to generate the desired surface on the cutting blade.

DETAILED DESCRIPTION OF THE INVENTION

The preferred embodiments of the present invention will now be described with reference to the accompanying Drawing Figures.

The process of the present invention makes possible the forming of any number of desired surfaces, even of different configurations, on a cutting blade. This is accomplished by a particular grinding wheel configuration and the traversal of the cutting blade across the grinding wheel along a desired path to form a particular blade surface.

When a workpiece is repeatedly traversed, perpendicular to the axis of a grinding wheel, from inside to outside across a side surface of the grinding wheel it is the tendency of the wheel, which is initially flat, to gradually wear to an inclined profile sloping downwardly (when viewed as in FIG. 2) from inside to outside. Initially, the bulk of the desired amount of material to be removed from the workpiece is removed by the grinding at or near the inner end of the grinding wheel surface with less material being removed as the workpiece is traversed across the face of the wheel. Continued grinding gradually results in the formation of the inclined downwardly sloping profile across the entire face of the grinding wheel surface. Once this inclined profile extends across the entire width of the grinding wheel face a steady state is reached and any additional grinding will not significantly alter the inclined profile shape of the grinding surface. In this steady state the finished surface on a workpiece is controlled by contact with the highest grain of abrasive material located at the outside edge of the grinding surface and the distance the workpiece is fed during one revolution of the grinding wheel. This highest grain produces essentially a set of spiral furrows on the workpiece surface shaped similar to, but dimensionally much smaller than, the grooves formed on the surface of a phonograph record.

Applicants have now unexpectedly discovered that by forming a narrow substantially flat surface on the outside portion of the wheel surface of a grinding wheel having an inclined surface and keeping this narrow substantially flat surface tangent to a surface of a workpiece during finish grinding, the surface finish of a workpiece is improved greatly. The substantially flat surface enables an increase in the number of active finishing grains contacting the workpiece thereby eliminating the spiral furrows, discussed above, and improving the finished surface of the workpiece. The combination of inclined and flat surfaces on the grinding wheel surface enable either or both of rough and finish grinding to be performed on a workpiece utilizing the single, simple profiled grinding wheel of the present invention.

Figure 1:
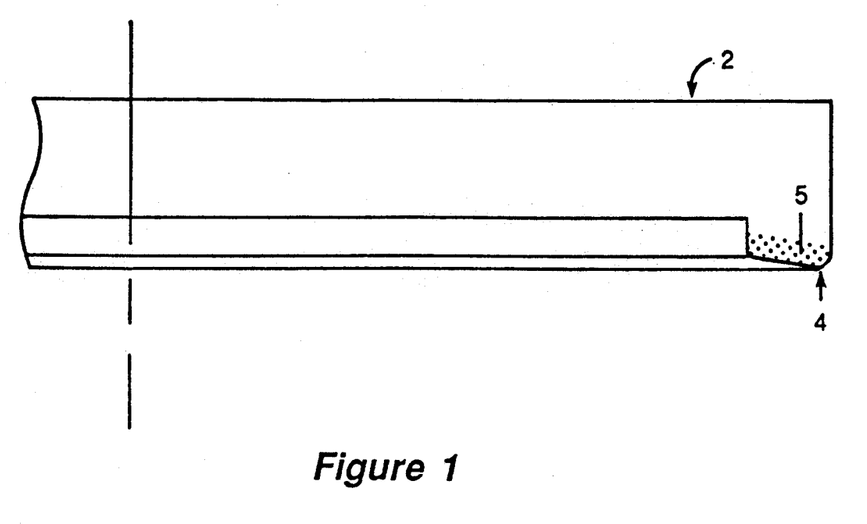
FIG. 1 illustrates the grinding wheel of the present invention with the grinding profile located on a face thereof.
Figure 2:
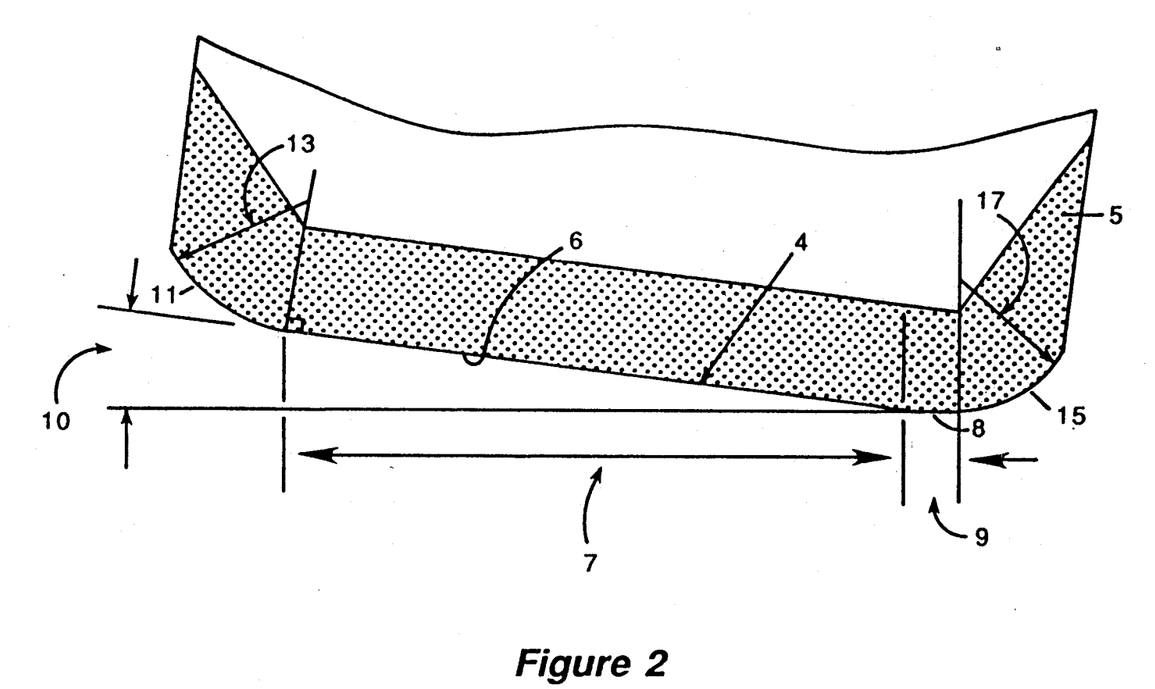
FIG. 2 shows an enlarged view of the grinding profile having an inner conical surface and an adjacent outer narrow substantially flat surface.

FIGS. 1 and 2 illustrate the grinding wheel of the present invention. The grinding wheel 2 has a grinding profile 4 comprising abrasive material 5 located on a face thereof. The grinding profile 4 comprises at least two surface portions (FIG. 2), an inner conical surface 6 and an adjacent outer narrow substantially flat portion 8. Inner conical portion 6 is inclined with respect to the adjacent outer narrow substantially flat surface 8 at an angle 10 which is relatively small, for example, generally about 4 degrees to about 12 degrees and preferably about 5 degrees to about 8 degrees. The inner conical surface 6 is substantially wider than the adjacent outer narrow substantially flat surface 8. The width 9 of the outer narrow substantially flat surface 8 is up to about 0.050 inches and preferably about 0.030 inches, the minimum width being a width greater than a single grain of abrasive or greater than about 0.004 inches. The width 7 of the inner conical surface 6 is determined by the maximum depth of stock material to be removed from the cutting blade divided by the tangent of angle 10 and is generally about 0.30 inches to about 0.40 inches.

The grinding profile 4 may further include an inner arcuate grinding surface 11 having radius 13 located inwardly of inner conical surface 6 and an outer arcuate grinding surface 15 having radius 17 located outwardly of outer narrow substantially flat surface 8. The radius 17 of the outer arcuate grinding surface 15 is generally about 0.060 inches to about 0.100 inches and the radius 13 of the inner arcuate grinding surface 11 is about 20% to about 40% larger than radius 17.

Figure 3:
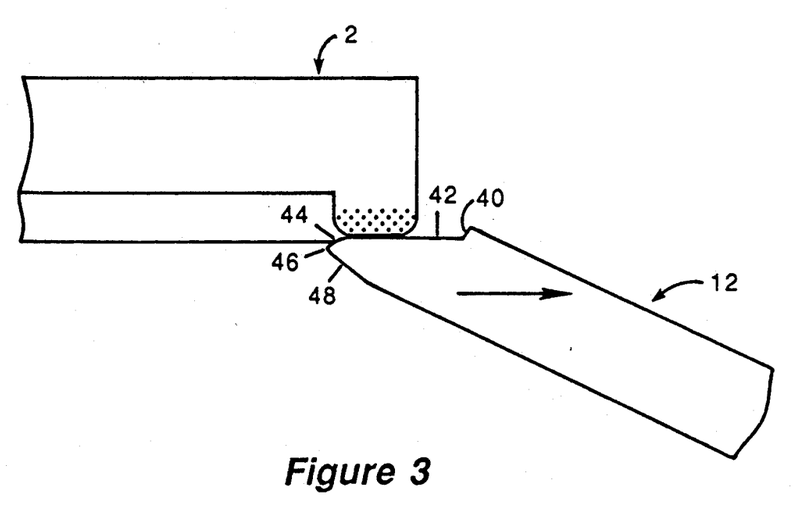
FIG. 3 illustrates the generating of a surface on a cutting blade by traversing the blade across the grinding profile.

FIG. 3 shows the traversal of an area or side of a cutting blade 12 across the grinding profile 4 of grinding wheel 2. Among the areas or sides which may be ground are the shoulder 40, the cutting side 42, the edge radius 44, the blade end 46 and the clearance side 48. Taken together, the edges of these areas or sides form the profile of the cutting blade 12. The cutting blade 12 is moved across the grinding profile 4. The material that must be removed from the cutting blade 12 is substantially removed by contacting the blade area or side with the inner conical surface 6, the inner arcuate surface 11 or the outer arcuate surface 15 of the grinding profile 4 thus producing a roughed surface. The finished or final blade surface is produced by tangentially contacting the roughed blade surface with the outer narrow substantially flat surface 8 of the grinding profile 4. The surface finish of the cutting blade 12 is influenced more by the tangential movement of the cutting blade 12 than by the smoothness of the grinding profile 4 or the condition of the abrasive grains.

An advantage of the present process is that since it is not required to reshape the wheel profile 4 to accommodate a variety of cutting blade shapes it becomes feasible to make the grinding wheel with an expensive, highly durable abrasive material such as cubic boron nitride (CBN) crystals, although other materials, such as aluminum oxide, may also be utilized. For example, a grinding wheel comprised of CBN crystals would enable sufficient cutting tool material to be removed during each pass across the face of the grinding wheel that it may be possible to grind most blade shapes with a single pass. A grit size of about 80 mesh to about 120 mesh is usually preferred and wheels containing these grit sizes are generally capable of producing surface finishes of less than about 20 microinches (Ra) and less than about 10 microinches (Ra) respectively.

The present invention also includes grinding wheels made of abrasive materials of different grit sizes. Coarse grains are generally more durable and therefore the selection of a coarse grit abrasive for at least the inner rough grinding surfaces, that is, the inner conical surface 6 and inner arcuate surface 11, where substantially all grinding occurs, reduces wear of these areas. A finer grit size for the outer narrow substantially flat surface 8 is selected depending upon the desired finished surface of a particular workpiece. The outer arcuate surface 15, being a rough grinding surface, also may be made from a coarse grit material thus forming a three-section wheel. However, since substantially less rough grinding is performed by the outer arcuate surface 15 compared to the inner surfaces 6 and 11, the outer arcuate surface 15 may be made from the same grit size material as outer narrow substantially flat surface 8. Assembly of this type of grinding wheel is simpler and less expensive since only two sections of grinding material, coarse grit size surfaces 6,11 and finer grit size surfaces 8,15, need to be assembled.

Another advantage of the present process is that since only the outer narrow substantially flat surface 8 of the grinding profile 4 produces a finished surface, only this outer narrow substantially flat portion 8 needs to be reprofiled, for example by the use of a diamond tool, to preserve the shape of the substantially flat surface 8 and location adjacent to the inner conical surface 6.

The various surfaces required on a cutting blade are produced by presenting various sides or areas of the cutting blade in succession to selected surfaces of the grinding profile 4 on the grinding wheel 2. Finish grinding may directly follow rough grinding by traversing the cutting blade 12 across both the inner conical surface 6 and the adjacent outer narrow substantially flat surface 8. The cutting blade may then be indexed to another side or area and the process repeated. On the other hand, for example, a first surface may be rough ground followed by rough grinding of a second surface and then the first and/or second surfaces may be finish ground. Any combination of rough and finish grinding operations on any number of sides or areas are possible with the grinding profile and method of the present invention.

The apparatus for performing the inventive process can be any apparatus capable of orienting a cutting blade and grinding wheel so that the various sides or areas of the cutting blade can successively be presented to any desired surface or surfaces on the grinding profile. An example of machines of this type are those generally known as computer numerically controlled or CNC machines which comprise a plurality of axes along which movement of a grinding or cutting tool and a workpiece can be controlled in order to orient the tool and workpiece relative to one another in almost any position within the operational limits of the machine.

CNC systems for controlling movement of multiple machine axes along prescribed paths are now commonplace. Such state-of-the-art systems are incorporated in the present invention to control movements of selected axes along prescribed paths for forming surfaces on cutting blades by traversing the cutting blade across selected surfaces of a grinding wheel. One such machine is shown in previously discussed U.S. Pat. No. 4,186,529, the disclosure of which is hereby incorporated by reference.

Figure 4:
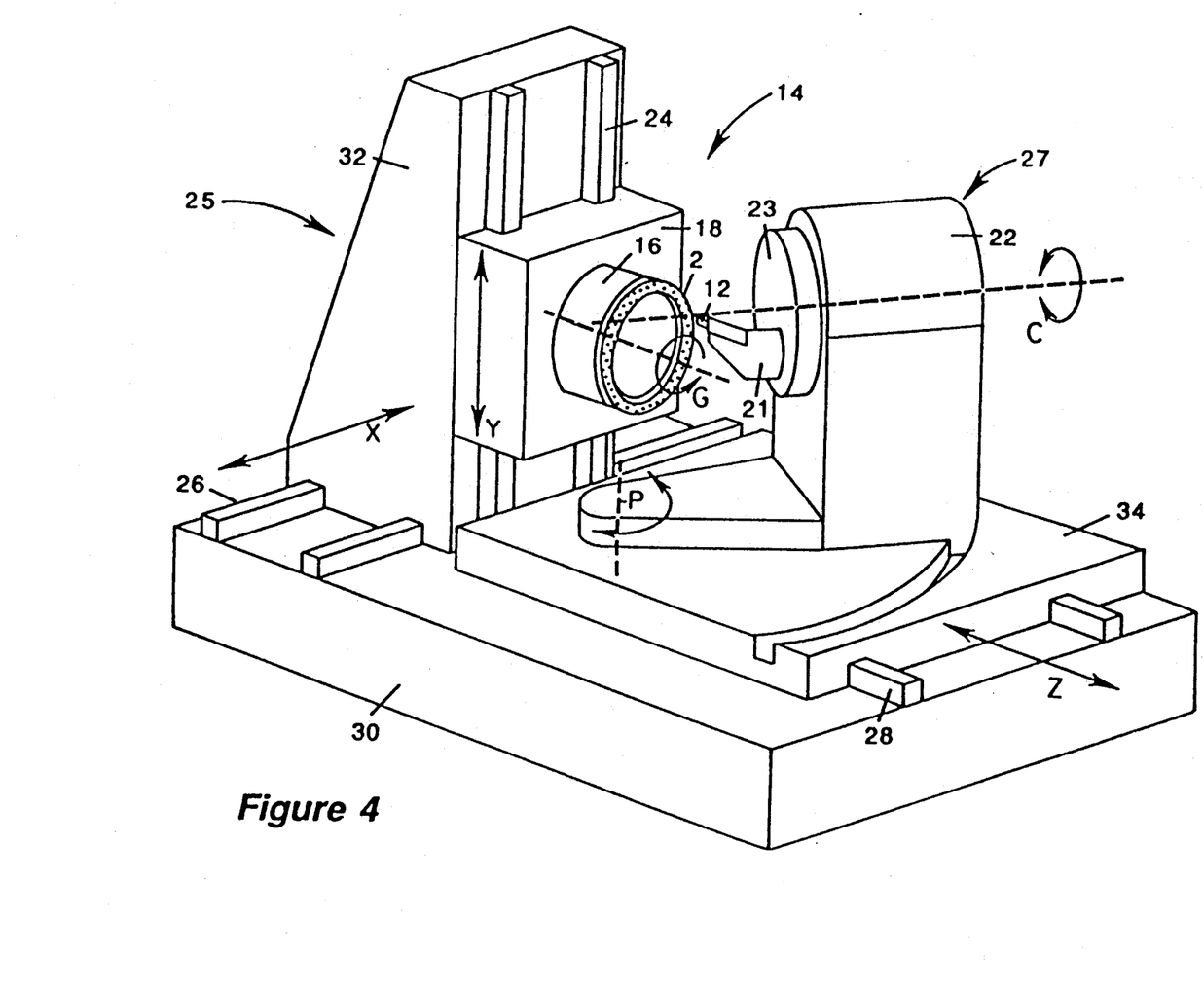
FIG. 4 is a schematic representation of a machine for carrying out the method of the present invention.

An example of another such machine is shown schematically by FIG. 4. This apparatus is similar to that shown by commonly assigned U.S. Pat. No. 4,981,402 the disclosure of which is hereby incorporated by reference.

The apparatus 14 comprises a tool support 25 for a grinding wheel 2. The grinding wheel 2 is releasably mounted to a tool spindle 16 which is in turn journaled for rotation in tool head 18. Tool head 18 is capable of vertical movement (Y-axis) along ways 24 attached to carriage 32. Tool support 25 is capable of horizontal movement (X-axis) along ways 26 attached to machine base 30. Grinding wheel 2 is capable of rotary movement about its rotational axis G.

Apparatus 14 also comprises work support 27 wherein cutting blade 12 is releasably mounted in work holder 21 which is secured to work spindle 23. Work spindle 23 is journaled for rotation in work head 22 and is capable of rotary movement about a longitudinal axis C. Work head 22 is mounted onto table 34 and is capable of angular (pivotal) movement about vertical pivot axis P. It can be seen that the same relative angular or pivotal movement could be attained by having carriage 32 pivot about a vertical axis. Table 34 is capable of horizontal movement (Z-axis) along ways 28 attached to machine base 30.

Ways 24, 26 and 28 permit relative linear movement of the grinding wheel 2 and cutting blade 12 in three mutually orthogonal directions.

Movement of tool spindle 16, work spindle 23, work head 22, table 34, tool head 18 and carriage 32 is imparted by separate drive motors (not shown). The above-named components are capable of independent movement with respect to one another and may move simultaneously with one another. Each of the respective motors is associated with either a linear or rotary encoder (not shown) as part of a CNC system which governs the operation of the drive motors in accordance with instructions input to a computer (not shown). The encoders provide feedback information to the computer concerning the actual positions of each of the movable axes.

It can be clearly seen that by relative movement of the grinding wheel 2 and cutting blade 12 along any or all axes it is possible to orient the grinding wheel 2 and cutting blade 12 with respect to one another so that any side or area of the cutting blade 12 may be presented to any desired surface of the grinding wheel 2. Once presented, movement of the grinding wheel 2 and/or the cutting blade 12 is effected to cause the cutting blade 12 to traverse across the grinding profile 4. The path of traversal is directed by the computer, in response to input instructions, to control movements along respective axes in order to generate a desired surface on the cutting blade. Once a desired surface has been generated, the position of the grinding wheel 2 and/or the cutting blade 12 is changed to cause the cutting blade 12 to index to the next side or area to be ground and the generating process for that particular surface is implemented. The sequence continues until all desired surfaces have been generated on the cutting blade. Since the grinding wheel is capable of producing any desired surface, there is no need to change grinding wheels for each generated surface.

The particular generating path or paths of the grinding wheel 2 and cutting blade 12 are in response to mathematical equations which direct the computer via numerical control to change the relative positions of the grinding wheel 2 and/or cutting blade 12 by continuously imparting movement along any or all of the axes. It can be seen that it is possible to generate a particular surface, index to another cutting blade side or area, generate a surface of a different configuration, and so on. However, it is to be understood that the formation of different surfaces cannot be accomplished without the particular shape of the grinding profile and the inventive method of grinding utilizing the grinding profile.

With reference to FIGS. 5-11 an example of a grinding sequence will now be described. Movement along all axes is in response to instructions input to a computer which directs drive motors associated with each axis to impart motion along or about each axis thereby causing relative movement between the grinding wheel and the cutting blade. Coolants utilized are generally oil for CBN wheels and water or oil for aluminum oxide wheels.

Figure 5:
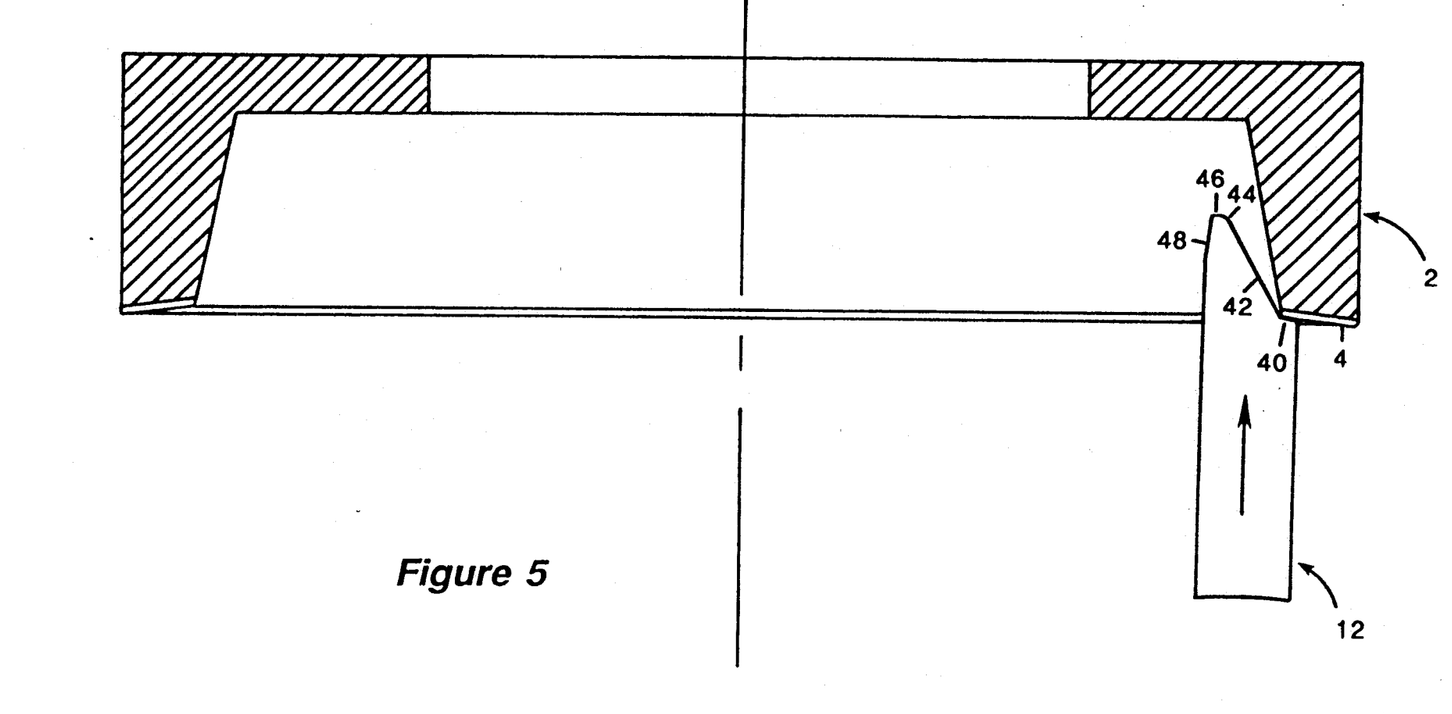
FIGS. 5-11 illustrate an example of the respective movements of a cutting blade and grinding wheel required to generate a plurality of surfaces on the cutting blade.

In FIG. 5 the cutting blade 12 is moved toward the grinding wheel 2 by movement along the Z-axis and the shoulder 40 of the cutting blade 12 is ground by contacting inner conical surface 6 and inner arcuate surface 11 of the grinding profile 4. The blade 12 is withdrawn for the next sequence.

Figure 6:
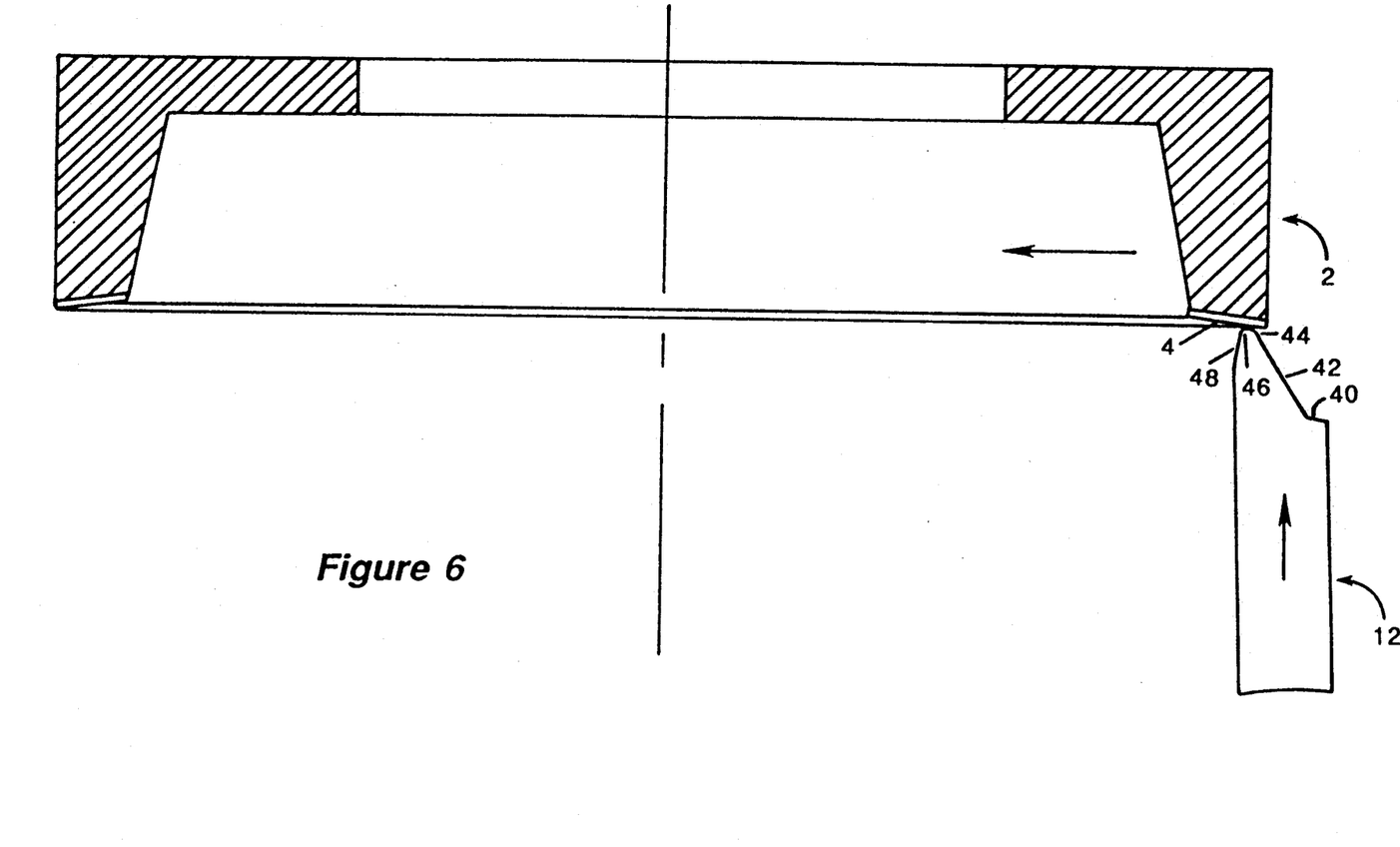

The next step in the grinding sequence as shown by FIG. 6 is rough grinding the end 46 of the blade 12. This is accomplished by feeding the blade end 46 in along the Z-axis until the desired blade end position is aligned with the plane of rotation of the outer narrow substantially flat surface 8. The grinding wheel 2 is then moved along the X-axis with grinding occurring as the blade end 46 is traversed across the inner conical surface 6. The amount of stock that can be removed is usually up to about 0.040 inches so if more stock must be removed the sequence should be repeated.

Figure 7:
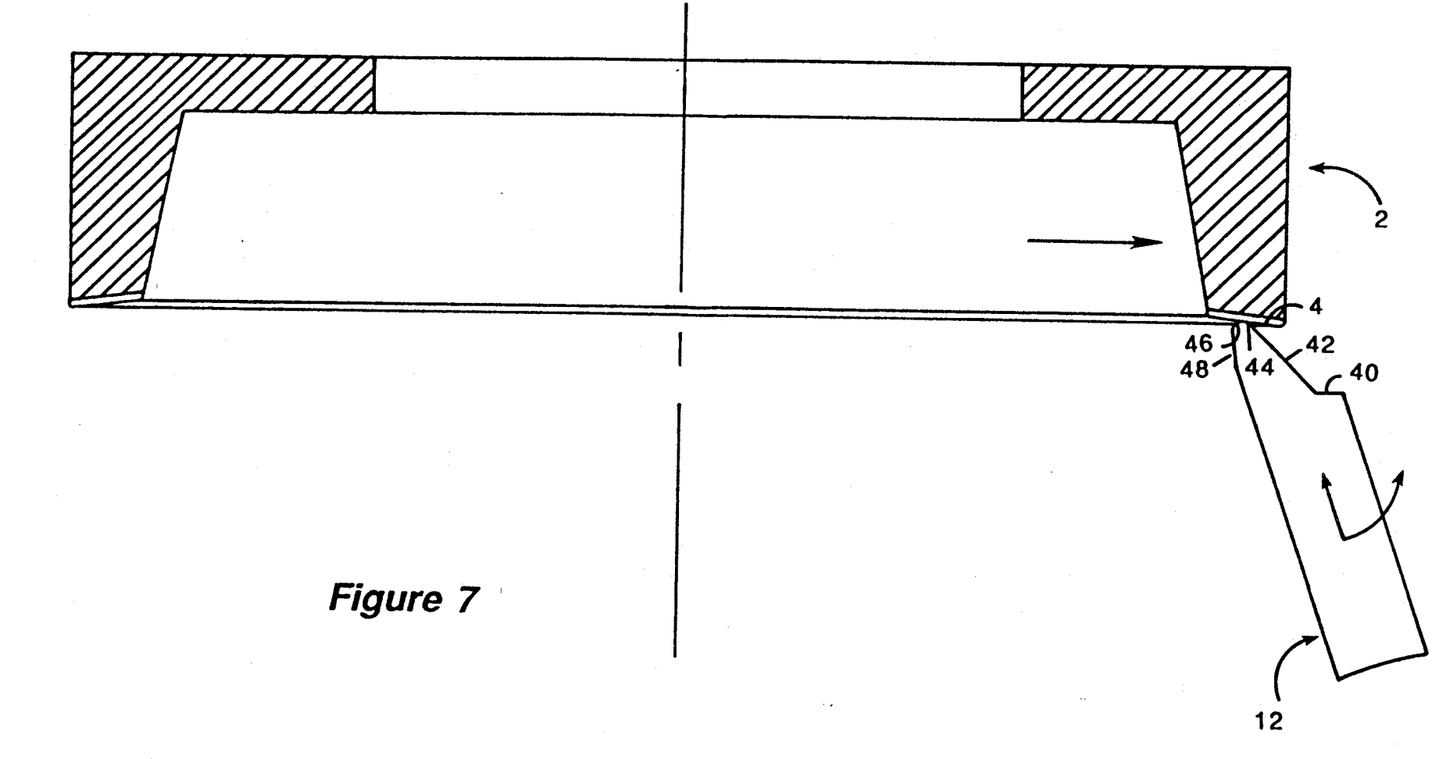

FIG. 7 illustrates the next grinding step which is rough grinding the edge radius 44. The blade end 46 follows the wheel profile as the blade 12 rotates about the P-axis towards the angular position for the next grinding sequence. Note that as the grinding wheel 2 moves along the X-axis the blade 12 must be fed in along the Z-axis, due to the conical surface of the grinding profile, to maintain contact with the inner conical grinding surface. The rotation about the P-axis brings the blade to the next grinding sequence.

Figure 8:
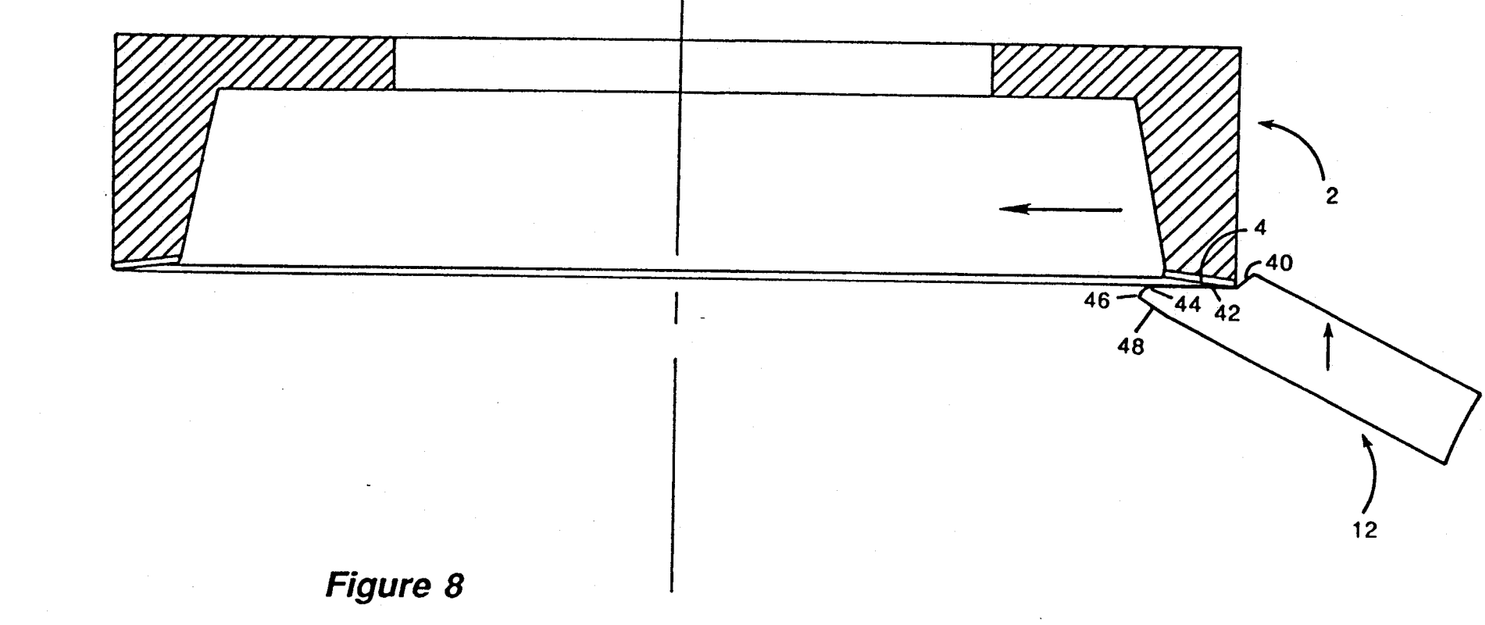

The next step in the grinding process is shown by FIG. 8. The blade 12, having completed rotation about the P-axis from the previous step, is now in position for the cutting side 42 to be generated. The blade is fed in on the Z-axis and then the grinding wheel is traversed along the X-axis to generate cutting side 42. The inner conical portion 6 of the grinding profile 4 generates a roughed surface removing most of the blade stock and the outer narrow substantially flat surface 8 of the grinding profile 4 generates the finished surface predominantly by the tangential movement across the blade cutting side 42.

While the above-described step of generating the cutting side 42 produces a straight sided surface it is to be understood that surfaces other than straight may also be generated by a combination of movements along or about any or all of the Z-, X- and/or P axes.

Figure 9:
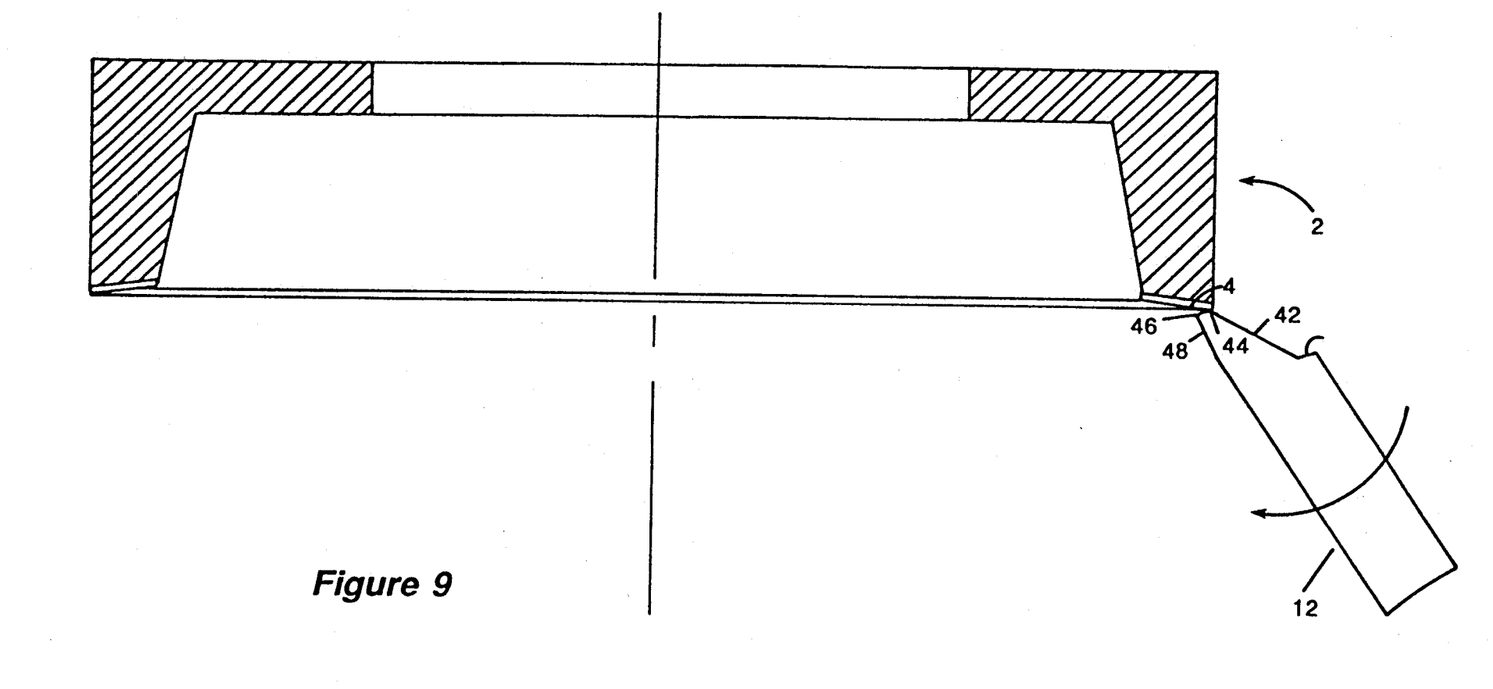

When the junction point between the cutting side 42 and the edge radius 44 reaches the middle of the flat narrow surface on the grinding profile 4, the cutting side 42 generating stops. The blade 12 is then rotated about the P-axis until the end of the blade 46 is parallel to the plane of rotation of the wheel 2. This sequence, as shown by FIG. 9, generates the finished surface on edge radius 44. Contact is maintained with the outer narrow substantially flat surface 8 of the grinding wheel profile 4 during blade rotation and movements along the Z-axis and X-axis are required to keep the edge radius 44 tangent to the outer narrow substantially flat grinding surface 8.

Figure 10:
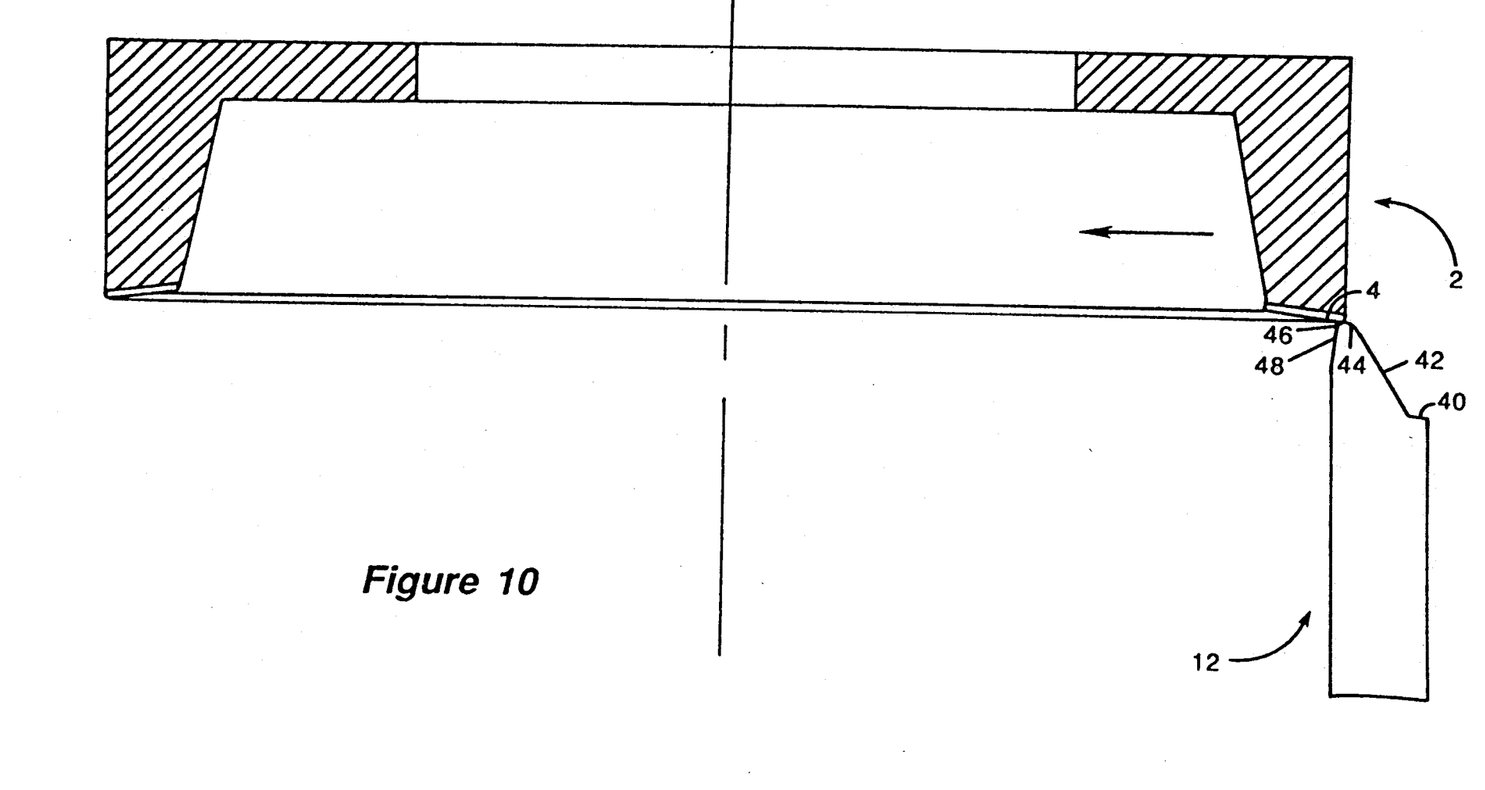

Once the end 46 of the blade 12 is parallel to the plane of rotation of the wheel 2, finish grinding of the blade end 46 is performed as shown by FIG. 10. The outer narrow substantially flat surface 8 of the grinding profile 4 is traversed along the X-axis while in contact with the blade end 46.

Figure 11:
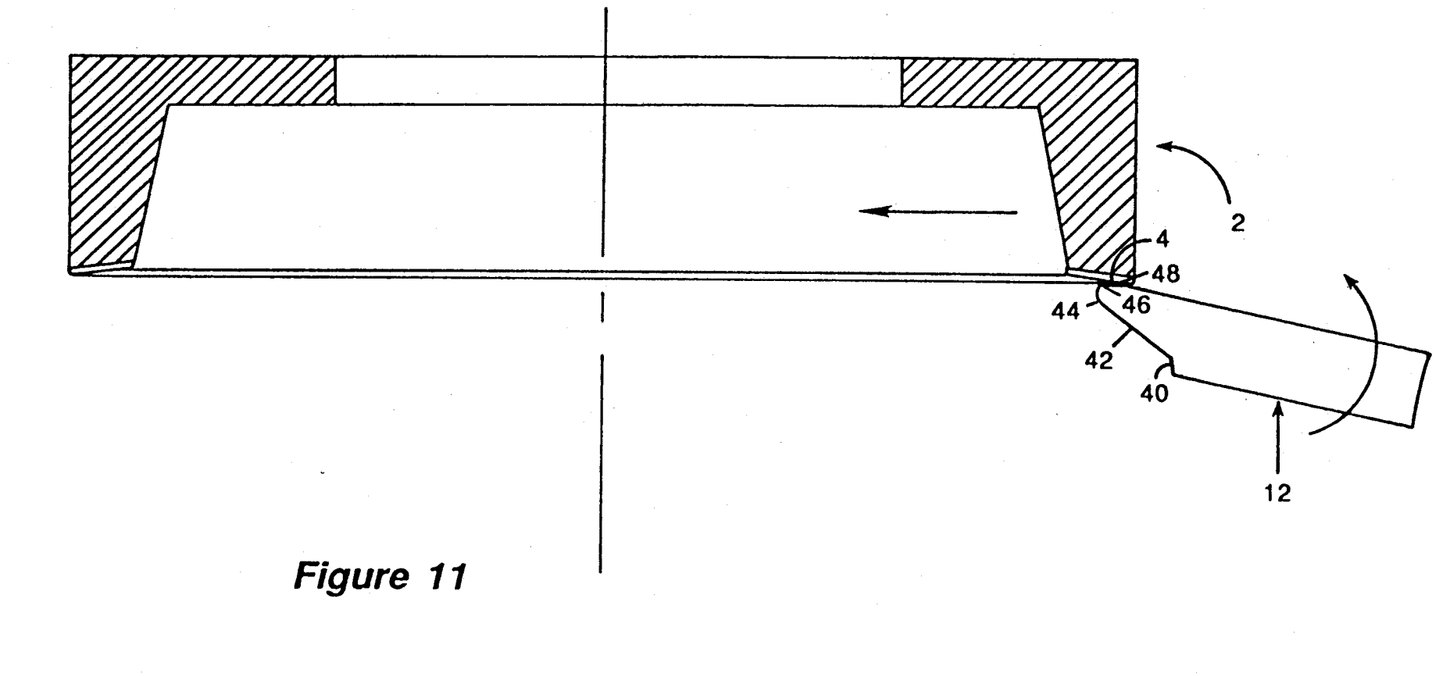

The final blade surface to undergo grinding is the clearance side 48. FIG. 11 illustrates this sequence wherein the blade 12 is rotated approximately 180 degrees about the C-axis and then moved to the required position by movements of the Z-, X-, and P-axes. The grinding wheel 2 is then traversed along the X-axis with both the inner conical surface 6 and the outer narrow substantially flat surface 8 of the grinding profile 4 contacting the clearance side 48 in succession to rough and finish grind respectively in one sequence.

From the example it can be seen that by the method of the present invention a blade can have any number of its surfaces ground in one continuous operation. It can also be seen that either rough grinding and/or finish grinding may be performed depending upon the particular surface of the grinding profile 4 contacted by a blade surface. Any sequence of rough and finish grinding operations is possible. As shown by the example the end 46 of the blade and the edge radius 44 of the blade are rough ground only, followed by the rough and finish grinding of the cutting side 42 and then returning to the blade end 46 and edge radius 44 for finish grinding and finally rough and finish grinding the clearance side 48 of the blade.

Regardless of the sequence of grinding operations it is the particular shape of the grinding wheel profile and the inventive method of grinding utilizing the grinding wheel profile which allows the formation of substantially any desired blade surface. Computer numerical control (CNC), in response to input instructions, enables relative movement of the grinding wheel 2 and/or cutting blade 12 along any or all axes thereby defining a path of traversal for generating all desired blade surfaces.

The present method is contemplated for regrinding any or all surfaces of substantially all types of cutting blades already in use to return the surfaces to the required configurations as well as for initially grinding any or all surfaces on substantially all types of blade blanks. Other uses will be evident to the skilled artisan.

While the process and apparatus herein described constitute preferred embodiments of the invention, it is to be understood that the invention is not limited to the precise steps of the process or construction of the apparatus, and that changes may be made therein without departing from the scope and spirit of the invention as defined by the appended claims.

What is claimed is:

1. A grinding wheel for abrasively removing material from a workpiece, said grinding wheel comprising:
   a grinding profile located on a face of said grinding wheel,
   said grinding profile comprising an inner arcuate grinding surface, an inner conical grinding surface, an adjacent outer narrow substantially flat grinding surface, and an outer arcuate grinding surface with said inner and outer grinding surfaces and said inner conical grinding surface being rough grinding surfaces and said adjacent outer narrow substantially flat grinding surface being a finish grinding surface,
   said inner conical surface being inclined at an angle with respect to said adjacent outer narrow substantially flat surface.

2. The grinding wheel of claim 1 wherein said grinding profile comprises cubic boron nitride.

3. The grinding wheel of claim 1 wherein said grinding profile comprises aluminum oxide.

4. The grinding wheel of claim 1 wherein said angle is about 4 degrees to about 12 degrees.

5. The grinding wheel of claim 4 wherein said angle is about 5 degrees to about 8 degrees.

6. The grinding wheel of claim 1 wherein said inner conical surface is about 0.40 inches in length.

7. The grinding wheel of claim 1 wherein said adjacent outer narrow substantially flat surface is up to about 0.050 inches in length.

8. The grinding wheel of claim 7 wherein said adjacent outer narrow substantially flat surface is about 0.030 inches to about 0.040 inches in length.

9. The grinding wheel of claim 1 wherein said inner conical surface comprises abrasive material grains coarser than the grains of said adjacent outer narrow substantially flat surface.

10. The grinding wheel of claim 1 wherein said inner arcuate surface, said inner conical surface and said outer arcuate surface comprise abrasive material grains coarser than the grains of said adjacent outer narrow substantially flat surface.

11. The grinding wheel of claim 1 wherein said inner arcuate surface and said inner conical surface comprise abrasive material grains coarser than the grains of said adjacent outer narrow substantially flat surface and said outer arcuate surface.

* * * * *